3,061,513
ANTIBIOTIC COMPOSITIONS COMPRISING SYNERGISTIC PROPORTIONS OF AN OLEANDOMYCIN ANTIBIOTIC IN COMBINATION WITH A TETRACYCLINE TYPE ANTIBIOTIC
Arthur R. English, Hohokus, and Tom J. McBride, Hackensack, N.J., assignors to Chas. Pfizer & Co., Inc., New York, N.Y., a corporation of Delaware
No Drawing. Filed Dec. 7, 1955, Ser. No. 551,537
8 Claims. (Cl. 167—65)

This application is concerned with certain compositions which are useful as therapeutic agents. In particular, it is concerned with compositions in which the antibiotic oleandomycin is combined with at least one antibiotic of the group tetracycline, oxytetracyline, chlortetracycline and other structurally related compounds.

Oleandomycin is the generic name for antibiotic PA–105 (also formerly known as amimycin) which is described and claimed in co-pending application Serial No. 518,722, filed on June 29, 1955, by Ben A. Sobin et al., now U.S. Patent 2,757,123, issued July 31, 1956. It is highly effective against a variety of microorganisms. It is formed by the growth of a strain of Stretomyces antibioticus (such as that deposited in the American Type Culture Collection under No. 11891) under aerobic conditions in a nutrient medium and it is recovered from such a medium by various methods such as solvent extraction.

Tetracycline, oxytetracycline and chlortetracycline are well known antibiotics which are described and characterized in numerous articles in the chemical and medical literature. Oxytetracycline can be recovered from the metabolism products of Streptomyces rimosus as described in U.S. Patent No. 2,516,080 which refers to the antibiotic by its trademark Terramycin. Chlortetracycline can be recovered from the metabolism products of Streptomyces aureofaciens as described in U.S. Patent No. 2,482,055 which refers to the antibiotic by its trademark Aureomycin. Tetracycline is readily produced by the catalytic dehalogenation of chlortetracycline as described in U.S. Patent No. 2,699,054 or it can be produced directly by fermentation methods from selected strains of microorganisms of the genus Streptomyces.

By an "oleandomycin antibiotic" we mean any of the various therapeutically effective forms of the antibiotic such as the free base, the hydrochloride, the phosphate, and salts of other pharmaceutically acceptable acids. We also mean by this term antibiotics which are structurally related forms of oleandomycin such as the antibiotic chloro-oleandomycin which can be obtained by bubbling anhydrous hydrogen chloride into a solution of oleandomycin in an organic solvent, and which may be converted by the standard procedures into the hydrochloride, the phosphate, or salts of other pharmaceutically acceptable acids.

By the term "tetracycline type antibiotic" in this application, it is meant to include antibiotics chosen from the group consisting of "tetracycline antibiotics," "oxytetracycline antibiotics," "chlortetracycline antibiotics," and other structurally related compounds. By "tetracycline antibiotics," "oxytetracycline antibiotics," "chlortetracycline antibiotics" is meant any of the various therapeutically effective forms of these antibiotics such as the hydrochloride, salts of other pharmaceutically acceptable acids, and the metallic salts of oxytetracycline— for example, sodium, potassium and like salts.

One of the most important uses of antibiotics is combating infective microorganisms responsible for pathological conditions. Illustrative of the particular effectiveness of the compositions of this invention in combating infective organisms is the following example. A strain of Micrococcus pyogenes var. aureus which is typical of the organisms of its genus responsible for many pathogenic conditions (for example, boils, abscesses, throat infections, ostemyelitis, blood poisoning and pneumonia) was isolated from a clinical case and proved to be highly resistant to the common antibiotics. It was found for example that the minimum inhibitory concentration (MIC) of oxytetracycline necessary to combat these organisms was in excess of 100 micrograms per millimeter (mcg./ml.) when treated with this antibiotic alone. However, mixtures of oleandomycin with oxytetracycline were found to be highly effective over a wide range, which range may vary from 90% oleandomycin to 10% oleandomycin by weight. A particularly effective mixture is one which contains 50% oleandomycin by weight with 50% oxytetracycline by weight which shows an MIC of 1.56 mcg./ml. against the microorganism Micrococcus pyogenes var. aureus.

It has been found that mixtures of this invention have a synergistic effect in combating many microorganisms—for example, against the microorganism Stretococcus faecalis mixtures of an oleandomycin type antibiotic with an oxytetracycline type antibiotic are more effective than either antibiotic alone. This effect was also noted with mixtures of oleandomycin and chlortetracycline against the microorganism Micrococcus pyogenes var. aureus and Streptococcus faecalis. These studies were carried out in vitro. The synergistic effect was also noted by carrying out in vivo studies with mice which had been infected with strains of Micrococcus pyogenes var. aureus. This synergistic effect manifests itself over the range 90% oleandomycin to 10% oleandomycin by weight of the composition.

The test with mice referred to above are the standard tests in which an experimentally significant number of mice are injected with a pathogenic microorganism and the infection combated with various dosages of an antibiotic. The number of survivors in each dosage level of the antibiotic is observed and this serves as a measure of the effectiveness of the antibiotic.

In determining the effectiveness of antibiotic there must be taken into account the tendency of some microorganisms to develop resistant strains or variants that show decreased susceptibility to the antibiotic. The mixtures of this invention are particularly effective in avoiding this difficulty. A striking example of this effect is illustrated by the action of the compositions of this invention against a Micrococcus pyogenes var. aureus as illustrated in Example III of this application which describes the action of a mixture of oxytetracycline and oleandomycin in retarding the emergence of resistant strains of this microorganism, using the tube transfer technique.

In the tube transfer technique referred to above, the microorganism is subjected to a series of progressively larger quantities of an antibiotic. In each individual test of the series the amount of antibiotic used is just short of the amount required to inhibit completely the growth of the microorganism; and, after the first test, the culture used in each succeeding test is the surviving culture from the previous test. Thus a more and more antibiotic resistant strain of the original microorganism is produced and tested.

A composition of this invention may contain an oleandomycin antibiotic in various proportions with at least one of the other antibiotics. The proportions may vary from 90% oleandomycin to 10% oleandomycin by weight on activity basis; however, we prefer to utilize a minor proportion of oleandomycin together with a major proportion of the other antibiotic. The range between 80% oleandomycin and 10% oleandomycin by weight on an activity basis is the most useful. A particularly advantageous composition contains two parts by weight of an oxytetracycline antibiotic and one part by weight of an oleandomycin antibiotic. Of course the proportions may be varied to meet the needs of particular cases. The antibiotics may be used in their pure form, in dilute form, or in the form of crude concentrates as long as each is employed in amounts sufficient to provide biologically active materials in the proportions specified.

The materials of this invention may be administered alone or in combination with pharmaceutically acceptable carriers, the proportions of which are determined by the suitability and chemical nature of the particular carrier, the chosen route of administration, and standard pharmaceutical practice. For example, in combating various infections, particularly those of the intestinal tract, they may be administered orally in the form of tablets or capsules containing such excipients as starch, milk, sugar, certain types of clay, etc. For intravenous and intramuscular administration they may be used in the form of a sterile solution containing other solutes—for example, enough saline or glucose to make the solution isotonic.

The physician or veterinarian will determine the dosage which will be most suitable in a particular application. The dosage which has been found most generally useful is one to four grams per day of one of the compositions which may be best administered by dividing into smaller dosages given at convenient intervals.

The following examples are given by way of illustration only and are not intended in any way to limit the scope of this invention. It is to be understood that the invention is to be limited only by the wording of the appended claims.

*Example I*

A strain of *Streptococcus faecalis* was grown in tubes in a nutrient medium containing commercial brain-heart infusion medium and separate portions were treated with oleandomycin and oxytetracycline individually as well as in mixture. The tubes were incubated at 37° for twenty-four hours and the MIC of the individual antibiotics and of the mixtures were recorded. It was found that the MIC of oleandomycin alone was 0.78 mcg./ml. and of oxytetracycline alone was also 0.78 mcg./ml. However, using a mixture containing one part by weight of oleandomycin and one part by weight of oxytetracycline the MIC was reduced to 0.39 mcg./ml.

*Example II*

Mice weighing from eleven to fifteen grams were separated into groups and infected with a normally lethal dose by the intraperitoneal injection of suspensions of a resistant strain of *Micrococcus pyogenes* var. *aureus* and treated subcutaneously with oxytetracycline alone, oleandomycin alone, and with a mixture containing one part by weight of oxytetracycline and one part by weight olendomycin. The percentage of survivors at various dosage levels was recorded. It was found that oxytetracycline was completely ineffective at dosages as high as 200 milligrams per kilogram (mg./kg.) of body weight. It was found that with a dosage of 12.5 mg./kg. of oleandomycin the percentage survival was 58%. However, using 25 mg./kg. of a mixture of oleandomycin and oxytetracycline containing 12.5 mg./kg. of oleandomycin and 12.5 mg./kg. of oxytetracycline, it was found that the percentage survival was increased to 75%.

*Example III*

Mice weighing from eleven to fifteen grams were separated into groups and infected with a normally lethal dose by the intraperitoneal injection of suspensions of a resistant strain of *Micrococcus pyogenes* var. *aureus* and treated orally with oxytetracycline alone, oleandomycin alone and with a mixture containing oleandomycin and oxytetracycline. The percentage of survivors at various dosage levels was recorded. It was found that oxytetracycline was completely ineffective at dosages as high as 200 mg./kg. of body weight. It was found that with a dosage of 12.5 mg./kg. of oleandomycin the percentage survival was 5%. However, using 25 mg./kg. of a mixture of oleandomycin and oxytetracycline combined in the ratio of 16 mg./kg. of oxytetracycline and 8 mg./kg. of oleandomycin, it was found that the percentage survival was increased to 20%. This is particularly noteworthy because the amount of oleandomycin administered in the mixture although less than the amount administered alone still increased the percentage of survivors by 15%.

*Example IV*

A strain of *Micrococcus pyogenes* var. *aureus* was grown in tubes in a nutrient medium containing commercial brain-heart infusion medium and divided into separate portions which were treated with amounts of oleandomycin and oxytetracycline individually as well as in a mixture, the amounts being just insufficient to bring about complete inhibition of the microorganisms, while incubating the tubes at 37° for twenty-four hours. The amounts of antibiotic were recorded. Samples of the culture were transferred to a fresh medium, the treatment repeated and the amounts of antibiotic which would just not completely inhibit growth after transfer were also recorded. Using oxytetracycline as the antibiotic it was found that the MIC necessary for complete inhibition was 250 mcg./ml. after eighteen transfers. Using oleandomycin, the MIC was found to be 5,000 mcg./ml. after eighteen transfers. However, when a mixture containing two parts by weight of oxytetracycline and one part by weight of oleandomycin was used, it was found that the MIC was only 0.312 mcg./ml. after eighteen transfers.

The temperatures in the above examples are all given in degrees centigrade.

What is claimed is:

1. A therapeutically effective composition comprising an oleandomycin antibiotic with a tetracycline type antibiotic, the oleandomycin content of the composition ranging from about one-third to about one-half parts by weight of the total antibiotic content.

2. A therapeutically effective composition comprising an oleandomycin antibiotic and a tetracycline antibiotic, the oleandomycin content of the composition ranging from about one-third to about one-half parts by weight of the total antibiotic content.

3. A therapeutically effective composition comprising an oleandomycin antibiotic and an oxytetracycline antibiotic, the oleandomycin content of the composition ranging from about one-third to about one-half parts by weight of the total antibiotic content.

4. A therapeutically effective composition comprising an oleandomycin antibiotic and a chlortetracycline antibiotic, the oleandomycin content of the composition ranging from about one-third to about one-half parts by weight of the total antibiotic content.

5. A therapeutically effective composition comprising approximately equal parts by weight of an oleandomycin antibiotic and a tetracycline type antibiotic.

6. A therapeutically effective composition comprising about one part by weight of an oleandomycin antibiotic and about two parts by weight of a tetracycline-type antibiotic.

7. A therapeutically effective composition comprising approximately equal parts by weight of an oleandomycin antibiotic and an oxytetracycline antibiotic.

8. A therapeutically effective composition comprising about one part by weight of an oleandomycin antibiotic and about two parts by weight of an oxytetracycline antibiotic.

References Cited in the file of this patent

Sobin et al.: "P.A. 105, A New Antibiotic," Antibiotics Annual, 1954–1955, Symposium October 25–29, 1954, pages 827–830.

(Other references on following page)

References Cited in the file of this patent

Antibiotics Annual, 1953-1954, Symposium October 28-30, 1953, pages 10-26 and 41-107.

Waksman: "Antibiotics of Actinomycetes," Conference on Antibiotic Research, Washington, D.C., January 31 and February 1, 1947, 9 pages, mimeographed, esp. at page 6.

Spicer: "Bacteriologic Studies of the Newer Antibiotics; Effect of Combined Drugs on Microorganisms," J. Lab. and Clin. Med., August 1950, pp. 183-191, esp. at p. 183.

Price et al.: Am. J. Pub. Health, March 1949, pp. 340-344.

Green: Chemical Age, April 23, 1949, pp. 592 and 593, at p. 593, col. 1, first complete paragraph.

Manuf. Chemist, June 1955, pp. 273-274.

Smith: J.A.M.A., vol. 145, No. 16, pp. 1268-1269, April 21, 1951, entry, "Penicillin-Resistant Staphylococci," esp. p. 1269, last par.

Armstrong et al.: J. Lab. and Clin. Med., vol. 37, No. 4, pp. 584-592, April 1951.

Romansky et al.: Squibb Abst. Bull., 24, p. A-274, March 28, 1951.

Felsenfeld et al.: Am. J. Pub. Health, vol. 41, No. 9, pp. 1078-1081, September 1951.

Jawetz et al.: Antibiotics and Chemotherapy, vol. 2, No. 5, pp. 243-248, May 1952.

Dowling: J.A.M.A., vol. 164, No. 1, May 4, 1957, pp. 44-48, esp. p. 45.

Jones et al.: The New England Journal of Medicine, vol. 257, No. 11, September 12, 1957, pp. 481-491, esp. 482-485.

Jones et al.: The New England Journal of Medicine, vol. 257, No. 12, September 19, 1957, pp. 536-547, esp. pp. 546 and 547.

Julius et al.: Antibiotics and Chemotherapy, vol. 8, No. 6, June 1958, pp. 287-296, esp. p. 294-295.

Marshall et al.: Bulletin Johns Hopkins Hospital, vol. 85, No. 3, September 1949; pp. 221-230.

Lasagna, reprint from: Journal of Chronic Diseases, St. Louis, vol. 1, No. 4, April 1955, pp. 353-367.

Hill: The New England Journal of Medicine, vol. 247, No. 4, July 24, 1952, pp. 113-119.

Beecher: J.A.M.A., vol. 159, No. 17, December 24, 1955, pp. 1602-1606.

Modell et al.: J.A.M.A., vol. 167, No. 18, August 30, 1958, pp. 2190-2199.

Goodwin et al.: Supplement to: The Journal of Pharmacy and Pharmacology, vol. 10, December 1958, pp. 24T-39T.

Gallego: "Interaction of Antibiotics," in Proceedings, 4th International Congress of Biochemistry, Vienna, 1958; volume V, Biochemistry of Antibiotics, ibid., pp. 134-165, pub. and copyrighted 1959 by Pergamon Press, Ltd. (Library of Congress, No. 59-8791) at 4-5 Fitzroy Sq., London W. 1, Great Britain.